United States Patent [19]

Parziale et al.

[11] 4,104,117
[45] Aug. 1, 1978

[54] NUCLEAR REACTOR POWER GENERATION

[75] Inventors: Ernest A. Parziale, Richland, Wash.; Dennis C. Richardson, Murrysville, Pa.

[73] Assignee: Westinghouse Electric Corp., Pittsburgh, Pa.

[21] Appl. No.: 766,477

[22] Filed: Feb. 7, 1977

[51] Int. Cl.² .............................................. G21C 7/00
[52] U.S. Cl. .................................... 176/20 R; 176/65; 60/644
[58] Field of Search ................... 176/19 EC, 19 R, 64, 176/65, 20 R; 60/644

[56] References Cited

U.S. PATENT DOCUMENTS

| | | | |
|---|---|---|---|
| 3,638,018 | 1/1972 | Gasper | 176/19 EC X |
| 3,719,557 | 3/1973 | Florjancic | 176/65 X |
| 3,734,823 | 5/1973 | Brown et al. | 176/65 X |
| 3,752,735 | 8/1973 | Musick et al. | 176/24 X |
| 3,778,347 | 12/1973 | Giras et al. | 60/644 X |
| 3,791,922 | 2/1974 | Musick | 176/19 EC X |
| 3,894,912 | 7/1975 | Cohn | 176/19 EC X |
| 3,973,402 | 8/1976 | Silvestri, Jr. | 176/65 X |
| 3,974,029 | 8/1976 | George et al. | 176/65 X |
| 4,000,037 | 12/1976 | Nusbaum et al. | 176/65 X |

Primary Examiner—Peter A. Nelson
Attorney, Agent, or Firm—D. C. Abeles; Z. L. Dermer

[57] ABSTRACT

The feedwater of a nuclear reactor at low-power levels, particularly during start-up, is controlled by combining an error signal component dependent on the departure of the actual level in the steam generator from a preset level and a component dependent upon the nuclear power delivered by the reactor. The nuclear-power change is the earliest reaction to the command to change the load level or to start up so that the nuclear-power component is a feedforwarded component. The invention prevents the system from "chugging." It also avails automatic control of the feedwater at low loading heretofore not feasible.

9 Claims, 15 Drawing Figures

NUCLEAR REACTOR POWER GENERATION

BACKGROUND OF THE INVENTION

This invention relates to the supply of electrical power and has particular relationship to the supply of power by a nuclear reactor. This invention has unique applicability to nuclear-reactor power-supply apparatus in which the nuclear reactor is of the pressurized-water (PWR) type having a primary coolant loop coupled in heat-exchange relationship with a secondary steam-generator loop. This invention also applies to boiling-water reactors (BWR) and to the extent that it may be so applied, such application is within the intended scope thereof.

As the load level of a nuclear reactor is changed, it is necessary that the flow of feedwater to the steam generators be changed. Typically, the feedwater flow to each steam generator is controlled by valves; a main valve in a main line and a by-pass valve in an auxiliary branch line which by-passes the main valve. At normal energy levels the control is effected by the main valve. The by-pass valve may be fully or partly opened or closed. At low load levels, predominately during start up, for example, 15% of nominal rated capacity, the main valve is closed and the control is effected by the by-pass valve.

In accordance with the teachings of the prior art, the feedwater control is carried out, both at high and low levels, by the combination of three components: generator water level, steam flow and feedwater flow.

Measured water level is compared against demanded or preset level and put through a proportional-plus-integral (PI) controller which functions to eliminate steady-state level errors. In addition there is a feedwater flow-steam flow mismatch channel which serves to anticipate an incipient level error. The summed level and flow mismatch signals then go through another proportional plus integral controller which eliminates steady state errors in feedwater flow.

The prior-art control functions satisfactorily at moderate or higher load levels but not at low load levels, for example, below 15% of nominal rated load. In fact because of this deficiency, automatic control of feedwater has not been feasible. Unless the feedwater is properly controlled at low levels, there is "chugging" during start up. This condition may be described as violent hunting induced by the flow of excessive cold feedwater into the generator while it is attempting to generate steam responsive to the command to start up.

It is an object of this invention to overcome the difficulties and disadvantages of the prior art and to provide nuclear-power generating apparatus in whose operation, particularly at low load levels, the feedwater flow shall be reliably, effectively and accurately controlled. It is also an object of this invention to provide such apparatus which shall lend itself to automatic control of feedwater flow at low load levels, typically between 0 and about 15% power operation where the by-pass feedwater line has a maximum capacity of about 20% of the nominal main feedwater flow.

Also, it is an object of this invention to provide an effective anticipatory signal for controlling the feedwater flow at low levels.

SUMMARY OF THE INVENTION

This invention arises from the discovery that at low load levels acceptable control of feedwater flow is not feasible because at such levels, a steam-flow measurement, of the accuracy demanded for reliable control of feedwater flow, is not available. This measurement is derived from a steamline differential pressure measurement, and at low steam flow the differential pressure is too small to produce an accurate signal. Change in the steam flow on changing the load level also occurs after the power generating apparatus has responded to the command to change power and is not entirely satisfactory for feedforward valve demand.

In accordance with this invention the feedwater flow is controlled by combining a level-measurement component and a nuclear-power-measurement component. The level-measurement component is derived in the same way as in the practice of the prior art. The sum of the steam pressure and the water pressure in the downcomer of the steam generator is measured by reference to a column of water and this magnitude is compared to the demanded water level to derive the level error which is fed into the control. The nuclear-power measurement is derived by measuring the neutron flux of the reactor typically with an x-core detector. The earliest response to the command to change the output is the retraction or injection of the control rods of the reactor. The immediate response to this change is the corresponding variation in the neutron flux. The measurement of the new neutron flux provides an early signal of the change in power level.

By virtue of the heat balance which exists during steady state, nuclear power is proportional to steam flow (plant load) and may therefore be used to provide the steady state demand component to the feedwater control valve. For load changes, measured nuclear power responds rapidly and quickly provides the new valve demand which balances the new steam flow. The level trim channel of the prior art is retained for maintaining zero steady-state level error. In addition the level trim channel accounts for the small discrepancy between measured nuclear power and actual nuclear power, including decay heat, at hot zero power.

For low-power feedwater control the apparatus, according to this invention, must operate through a smaller control valve (in the by-pass line) than that used at full power so that the valve operates in the linear part of its opening-flow characteristics. Alternatively, the desired linear operation may be obtained by providing variable-speed feedwater pumps.

While this invention has unique advantages over the prior art at low load, overall, at low or higher loads, it also has advantages over the prior art. It requires one less feedback variable and does not require a second proportional plus integral (PI) controller for satisfactory performance.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENT

Figure 1:
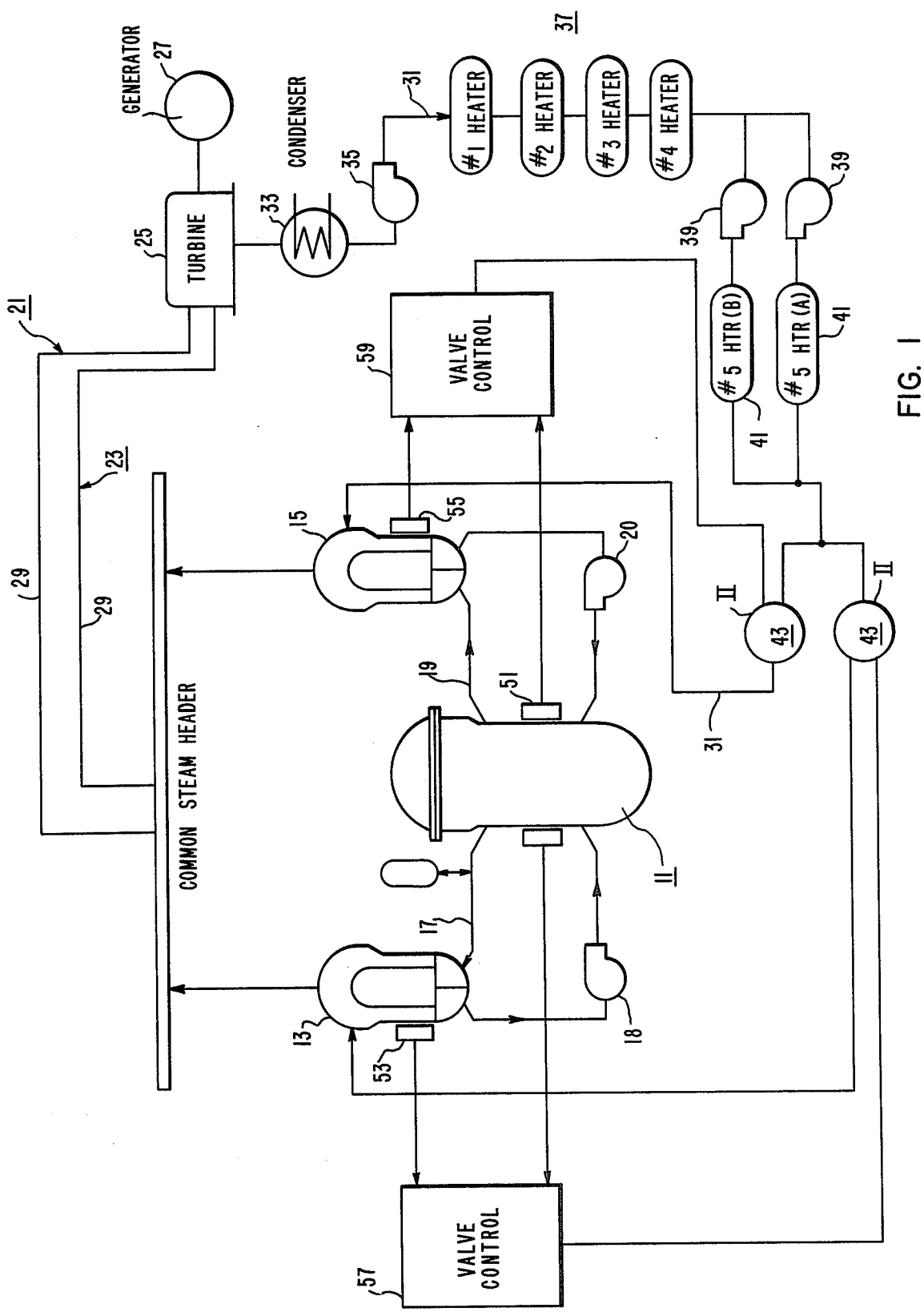
FIG. 1 is a diagrammatic view showing an embodiment of this invention.
Figure 2:
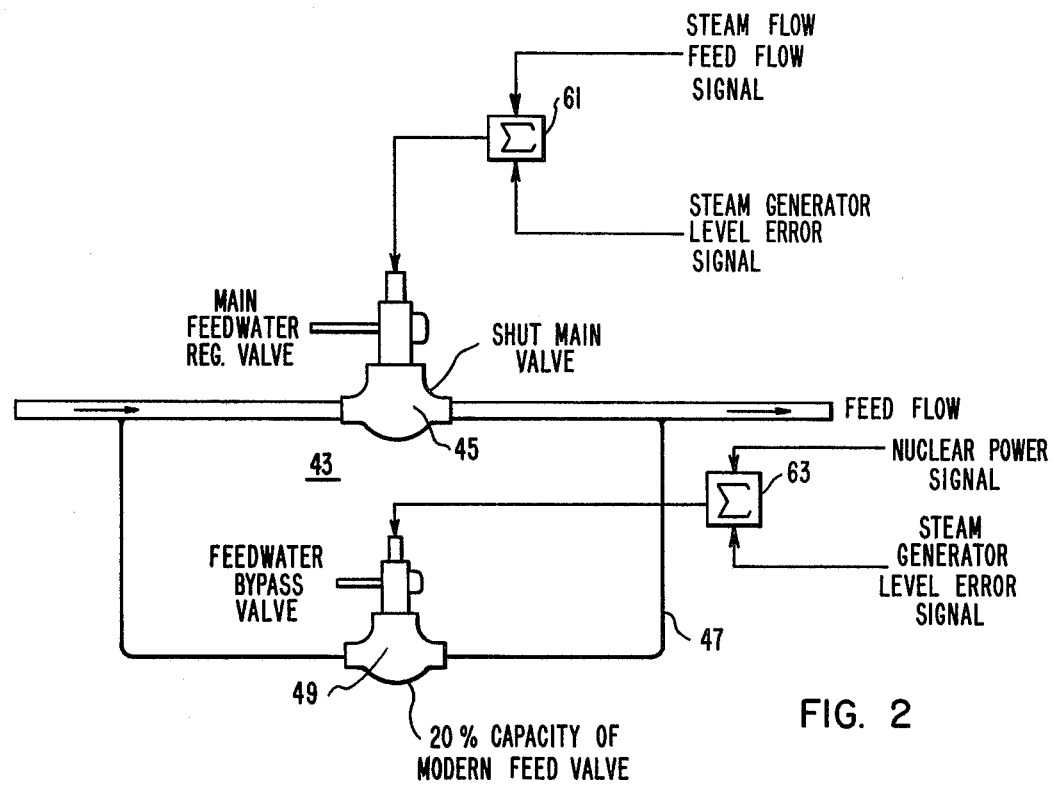
FIG. 2 is a fragmental diagrammatic view showing enlarged the portion of the apparatus of FIG. 1 shown in circles II of FIG. 1.

The apparatus shown in FIGS. 1 and 2 is a nuclear-reactor power-supply apparatus including a nuclear reactor 11 in thermal heat-exchange relationship with a plurality of steam generators 13 and 15. A primary loop 17 and 19 respectively, each including a pump 18 and 20, thermally interconnect the reactor 11 and each of the generators 13 and 15. Coolant, typically pressurized water, flows through the core (not shown) of the reactor 11 and through each of the generators 13 and 15. The heat derived by each primary loop 17 and 19 from the core vaporizes the water in each generator 13 and 15.

A secondary loop 21 and 23 is associated with each generator 13 and 15 respectively.

While this invention is uniquely suitable for steam-driven apparatus, the reference to "water" and "steam" in this application is not intended to limit this invention. To the extent that this invention is applicable to power generators driven by fluids other than water, such application is within the intended scope thereof and the use of words "water" and "steam" in this application and its claims, used in the interest of convenience, is intended to include within its scope such other fluids.

The apparatus shown in FIGS. 1 and 2 also includes a turbine 25 and an electrical generator 27 driven by the turbine 25. Each primary loop 21 and 23 includes a first branch 29 for circulating steam from each steam generator 13 and 15 to drive the turbine 25 and a secondary branch 31 for circulating feedwater from the turbine 25 to the corresponding steam generator 13 and 15. Common to the branches 31 is a condenser 33 for condensing the fluid from the turbine 25, a condensate pump 35 and a plurality of heaters 37. Each feedwater branch 31 also includes a feedwater pump 39, a heater 41, and a valve unit 43 (FIG. 2). Each valve unit 43 includes a main valve 45 in the main line. Across this valve 45 there is a by-pass line 47 in which there is a by-pass valve 49. Each by-pass valve 49 has about 20% of the capacity of the main valve 45 and serves to control the flow of feedwater during low-load levels.

The nuclear reactor 11 includes conventional means 51 for deriving a signal from the neutron flux dependent on the power of the reactor. Each steam generator 13 and 15 includes conventional means 53 and 55 for deriving signals dependent on the water lever error. Where the feedwater is controlled both at low-load levels and at higher-levels in accordance with this invention only a water-level error signal need be derived from each steam generator 13 and 15. Where the feedwater at higher load levels is controlled in accordance with the prior art and at low load levels in accordance with this invention, as for example where the control according to this invention is added to an existing installation, the means 53 and 55 deliver steam flow and feed flow signals. The signals from means 51 and 53 and 51 and 55 are electrical signals and are fed into valve controls 57 and 59 respectively for processing. The controls 57 and 59 control the valves 45 and 49 in the respective valve units 43. In FIG. 2 the valve 45 is shown to be controlled from the three-component prior-art control through summer 61 and the valve 49 in accordance with this invention through summer 63.

Figure 3:
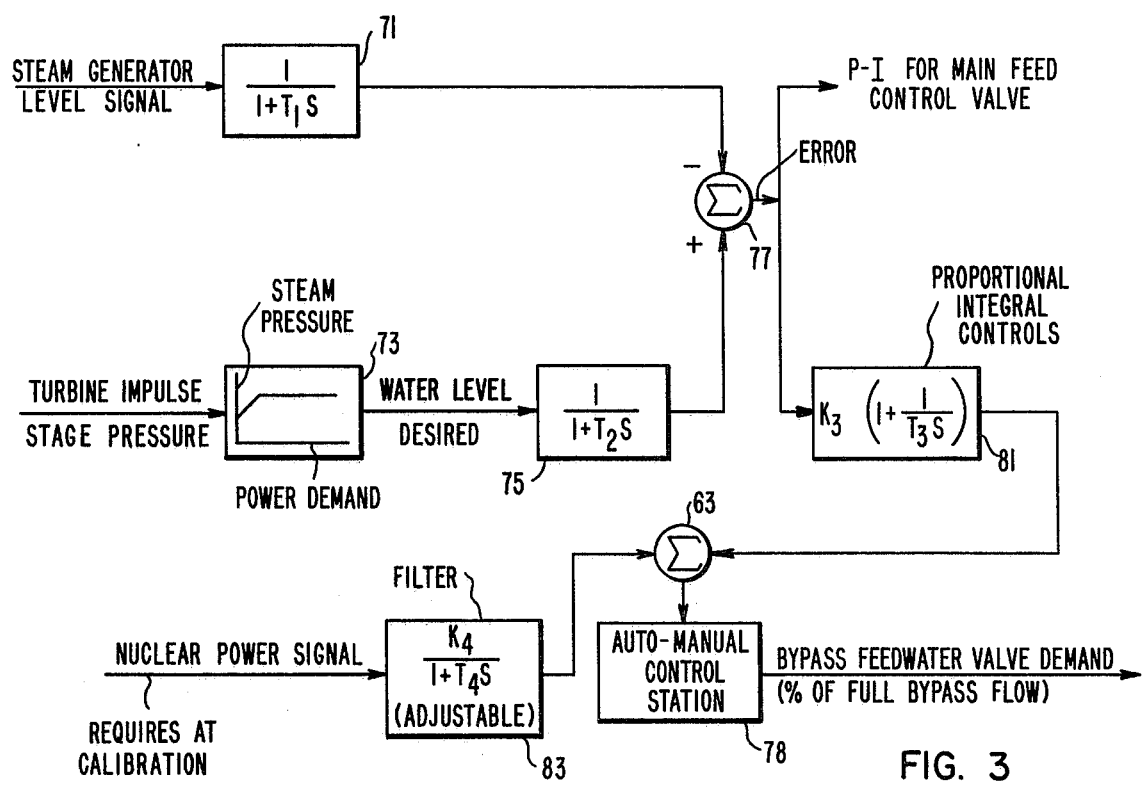
FIG. 3 is a flow diagram showing the interrelationship of the control components which cooperate in the practice of this invention.

As shown in FIG. 3, the actual electrical level signal from each steam genertor 13 and 15 is supplied to a filter 71 which filters out the noise. In the algebraic formula in this filter 71, S is LaPlace's function, the operator $d/dt$ where $t$ is the time, and $T_1$ is the time constant of the filter 71. The desired water level in each generator 13 and 15 is derived from the function former 73 when it is enabled by a command (Turbine Impulse Stage Pressure) to increase or decrease the power output of the apparatus. The function is represented graphically in the block 73. Power demand is plotted horizontally and steam pressure vertically. The curve yields the desired water level. The desired-water-level signal is passed through noise filter 75 whose time constant is $T_2$. The error is derived from the summer 77 on which the signals from filters 71 and 75 are impressed. The summer 77 derives the difference between these signals. The error signal is impressed on the main valve 45 through a proportional-integral control (not shown) and also on the summer 63 through proportional-integral control 81. In PI control 81, $K_3$ is the gain and $T_3$ the time constant. $K_3 = \%$ valve demand/% level error. The nuclear power signal is impressed on the summer 63 through filter 83 in which $K_4$ is the gain and $T_4$ the time constant. These parameters are adjustable. $K_4 = 1.0\%$ valve demand/% nuclear power for 100% nominal flow by-pass loop 47. The algebraic sum of the level error signal and the nuclear-power signal is delivered to an automatic-manual control station 78 which delivers the necessary commands to the by-pass valve 49.

The components in the blocks shown in FIG. 3, including the filters 71, 75, 83 and the PI unit 81 are solid-state electronic components typically supplied by Westinghouse Industrial Systems Division. Such components are conventional.

The integrals indicated in FIG. 3 are taken over the time during which the control is carried out. The level is regulated in a closed loop in which the feedback is the actual level signal of a steam generator at any instant. The nuclear power signal is injected in an open-loop circuit.

Figure 4:
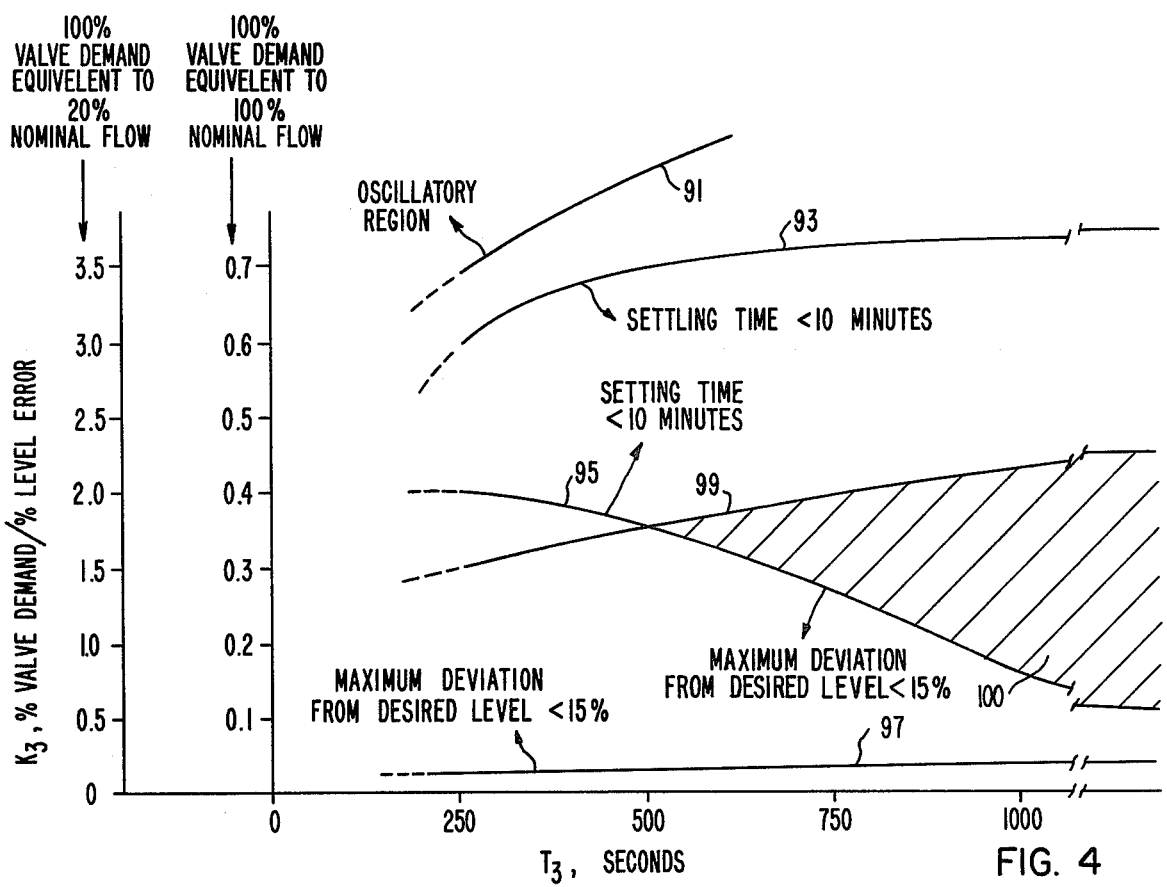
FIG. 4 is a graph showing the effects of different setpoints, derived from analog simulation, for apparatus according to this invention assuming a 5% load change.

FIG. 4 shows the effects, derived from analog analysis, of varying the parameters $K_3$ and $T_3$. $K_3$ is plotted vertically and $T_3$ in seconds, horizontally. Ordinates are shown with reference to 100% flow through the by-pass valve 49 (left) and with reference to 100% flow through the main valve 45 (right). Above the upper curve 91 the system oscillates. Below the next curve 93 and above the following curve 95 the settling time for the system is less than 10 minutes the desirable settling time. Below the next curve 99 and above the lowest curve 97 the maximum deviation from the desired level is less than 15%. The shaded area 100 shows the desired region of operation.

Figure 5:
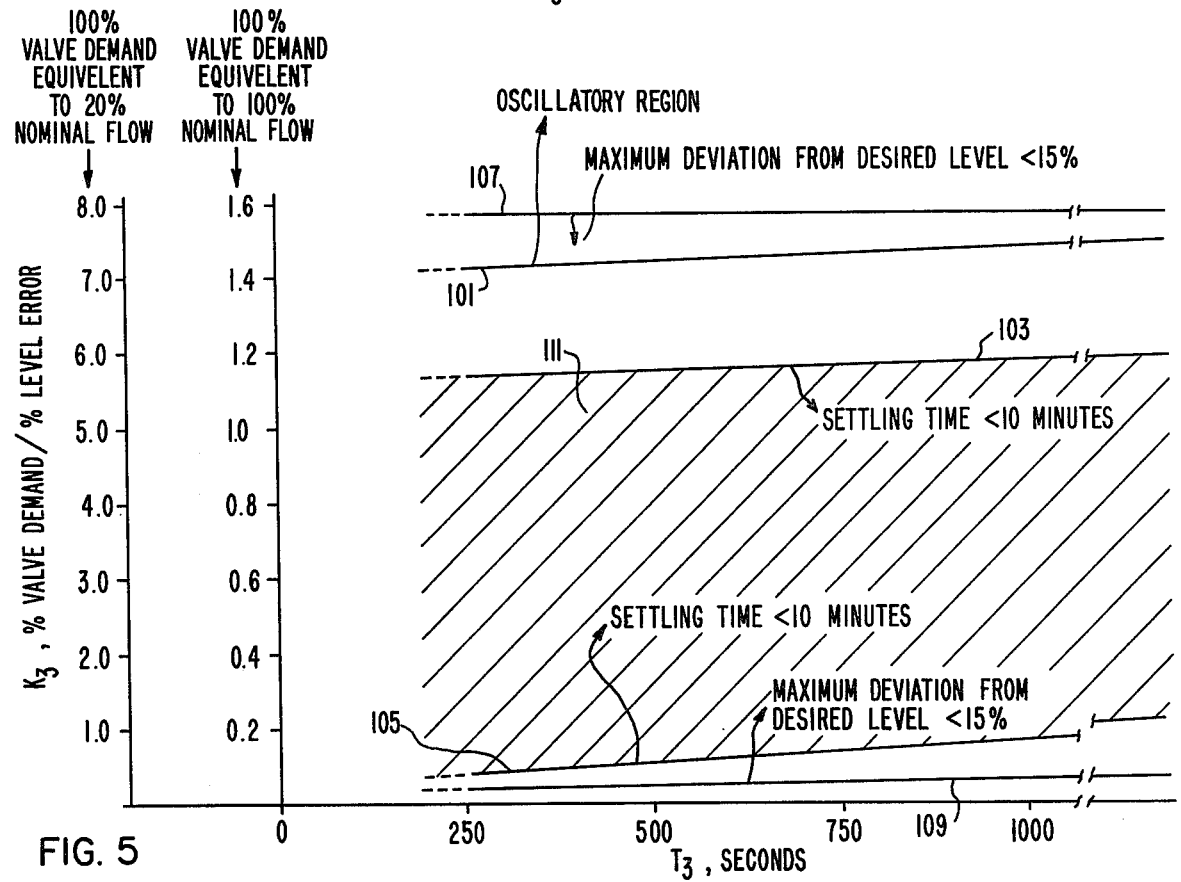
FIG. 5 is a similar graph derived from digital simulation in a LOFTRAN computer.

FIG. 5 is a graph similar to FIG. 4 derived by LOFTRAN digital analysis. The curves 101, 103, 105, 107, 109 and the shaded area 111 correspond to the curves 91, 93, 95, 99 and 97 and the shaded area 100 respectively of FIG. 4.

In FIGS. 6a through e the effects, on the various operating parameters of the apparatus, according to this invention, of a step decrease of 5% in the load level is shown graphically. These graphs are derived by digital computer analysis. In all graphs time in seconds is plotted horizontally. Points along the same vertical line passing through all graphs correspond to the same instant of time. In graphs a and c through e percent change is plotted vertically; in graph b temperature is plotted vertically in F°. Graph c shows the 5% step change in steam flow. Graph d shows that the maximum water-level change is only 10% and that the water-level change becomes zero in about 300 seconds. Graph e shows that the feedwater flow settles to a steady state in only about 300 seconds.

Figure 6:
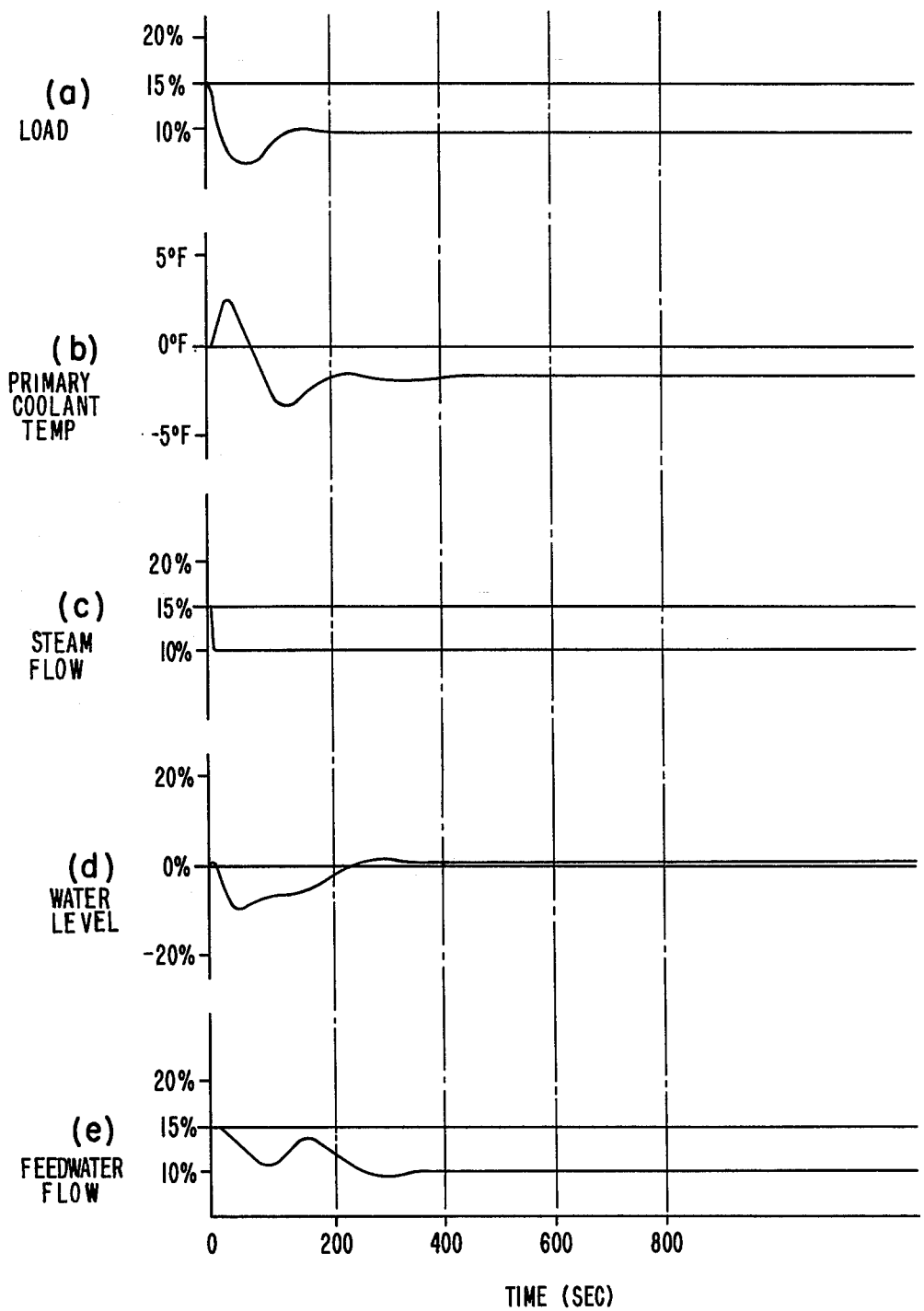
FIGS. 6a, b, c, d, e are graphs showing the changes in the various parameters of apparatus according to this invention for a step-load decrease of 5%.
Figure 7:
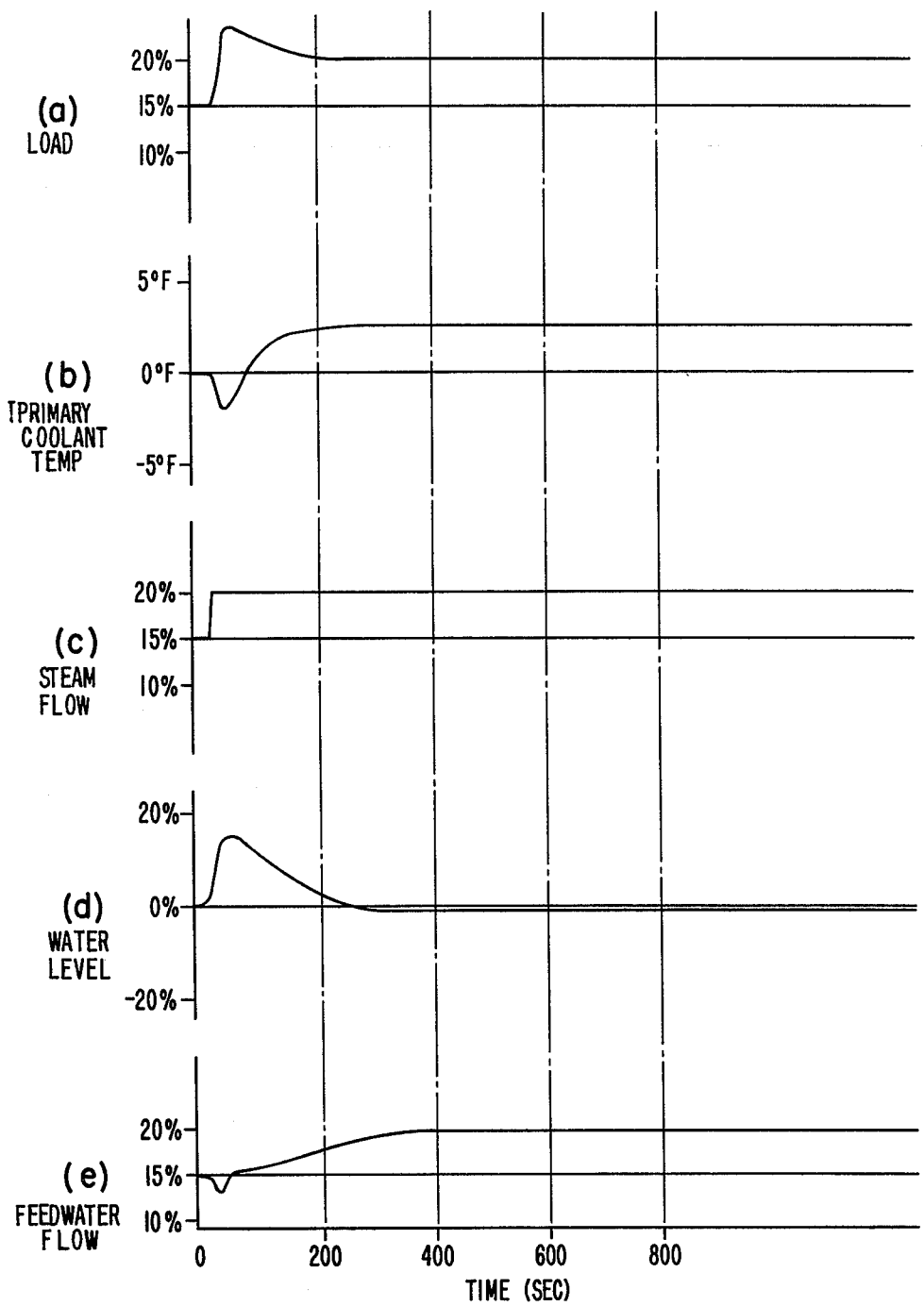
FIGS. 7a, b, c, d, e are similar graphs of a step-load increase.

As shown in FIG. 6, the decrease in steam flow causes a primary-to-secondary power mismatch leading to an increase in primary coolant temperature. The control rods drive into the core and reduce nuclear power to the new load level. On a load decrease the tendency for steam-generator water level is to decrease due to both the reduction in steaming power and increase in steam pressure, which increase the downcomer water density and collapse voids in the water. The feedwater flow is composed of a level channel component plus a feedforward nuclear power component. Note that the nuclear power component tends to quickly drive the feedwater flow to its new steady state level. The level trim channel, however, as a result of the level shrink, trys to increase the flow during the period when level is lower than its demanded value. The net effect is a ramp-like decrease in feedwater flow to its new steady state level which minimizes the level-error transient.

FIGS. 7a through e are similar to FIGS. 6a through e, but are plotted for a 5% step load increase such as would occur during start up. In this case the water-level change is only 15% and settles to 0 in about 300 seconds. The feedwater flow stabilizes in about 400 seconds.

While specific embodiments of this invention have been disclosed herein, many modifications thereof are feasible. This invention is not to be restricted except insofar as is necessitated by the spirit of the prior art.

We claim:

1. Apparatus for generating power including a nuclear reactor, a turbine to be energized from said reactor, a steam generator, connected to said reactor, for deriving energy therefrom, fluid-circulating means connected to said turbine and generator, said fluid-circulating means including a first branch for circulating steam from said generator to said turbine to energize said turbine and a second branch for circulating feedwater from said turbine to said generator, said feedwater to be converted into steam by said generator by the energy supplied by said reactor to said generator, valve means in said second branch for controlling the flow of said feedwater to said generator particularly at low load levels and means responsive to the magnitude of the power supplied by said reactor and the level of the water in said generator at low loads for controlling said valve means.

2. The apparatus of claim 1 including means connected to said reactor for circulating a coolant through said reactor to derive energy therefrom and also including means connecting the steam generator to said coolant-circulating means to derive the energy for converting the feedwater into steam from said coolant.

3. The apparatus of claim 1 wherein the second branch includes a main feedwater channel and a low-power feedwater channel, connected to said main channel to by-pass said main channel, said main channel including a main valve in said main channel for controlling the flow of feedwater at high load and said low-power by-pass channel including an auxiliary valve for controlling the flow of feedwater during low load, the said apparatus also including means connecting the controlling means to the auxiliary valve to control the auxiliary valve.

4. The apparatus of claim 3 wherein the low-power by-pass channel has a maximum capacity of about 20% of nominal main feedwater flow.

5. Apparatus for generating power including a nuclear reactor, a turbine to be energized from said reactor, a steam generator, connected to said reactor, for deriving energy therefrom, fluid-circulating means connected to said turbine and generator, said fluid-circulating means including a first branch for circulating steam from said generator to said turbine to energize said turbine and a second branch for circulating feedwater from said turbine to said generator, said feedwater to be converted into steam by said generator by the energy supplied by said reactor to said generator, valve means in said second branch for controlling the flow of feedwater to said generator and means responsive to the magnitude of the power supplied by said reactor and the level of the water in said generator at low loads for controlling said valve means.

6. The apparatus of claim 5 wherein the means responsive to the magnitude of the power supplied by the reactor is responsive to the neutron flux of the reactor.

7. Apparatus for generating power including a nuclear reactor, a turbine to be energized from said reactor, a steam generator, connected to said reactor, for deriving energy therefrom, fluid-circulating means, connected to said turbine and generator, said fluid-circulating means including a first branch for circulating steam from said generator to said turbine to energize said turbine and a second branch for circulating feedwater from said turbine to said generator, said feedwater to be converted into steam by said generator by the energy supplied by said reactor to said generator, valve means for controlling the flow of said feedwater to said generator, means, connected to said generator, for deriving an error signal by comparing the desired magnitude of an operating parameter of said generator and the actual magnitude of said parameter, means, connected to said reactor, for deriving another signal dependent on the power supplied by said reactor, and means, responsive to the algebraic sum of said first-named error signal and said other signal, for controlling said valve means.

8. The apparatus of claim 7 wherein the operating parameter is the water level in the generator and the signal dependent on the power supplied by the reactor is the neutron flux of said reactor.

9. The apparatus of claim 7 wherein the second branch includes a main feedwater channel and a low-power feedwater channel connected to said main channel to bypass said main channel and the valve means includes a main valve in said main channel for controlling the flow of feedwater to said generator at high load and said low-power channel including an auxiliary valve for controlling the flow of feedwater to said generator during low load, the algebraic-sum-responsive means controlling said auxiliary valve, said low-power channel in the maximum open setting of said auxiliary valve conducting only a relatively small fraction of said feedwater.

* * * * *